United States Patent [19]

Lin et al.

[11] Patent Number: 5,621,067
[45] Date of Patent: Apr. 15, 1997

[54] WHOLLY AROMATIC POLYAMIDES WITH IMPROVED FLAME RESISTANCE

[75] Inventors: Jin-Chyueh Lin, Kao-Hsiung Shiann; Jen-Chang Yang, Taipei; Ting-Hsiu Chen, Hsinchu, all of Taiwan

[73] Assignee: Industrial Technology Research Institute, Hsinchu, Taiwan

[21] Appl. No.: 413,846

[22] Filed: Mar. 30, 1995

[51] Int. Cl.$^6$ ............................................. C08G 73/10
[52] U.S. Cl. .......................... 528/310; 528/125; 528/128; 528/172; 528/173; 528/174; 528/176; 528/183; 528/188; 528/220; 528/226; 528/322; 528/335; 528/348; 528/350; 428/357; 428/364; 428/395
[58] Field of Search ..................... 528/125, 128, 528/172, 173, 174, 176, 183, 188, 220, 226, 335, 310, 322, 348, 350; 428/357, 364, 395

[56] References Cited

U.S. PATENT DOCUMENTS

| | | | |
|---|---|---|---|
| 3,063,966 | 11/1962 | Kwolek | 528/335 |
| 3,094,511 | 6/1963 | Hill, Jr. et al. | 528/335 |
| 3,287,324 | 11/1966 | Sweeny | 528/335 |
| 3,600,350 | 8/1971 | Kwolek | 528/335 |
| 3,888,821 | 6/1975 | Milford, Jr. | 528/335 |
| 4,196,118 | 4/1980 | Fujie et al. | 528/335 |
| 4,278,779 | 7/1981 | Nakagawa et al. | 525/432 |

*Primary Examiner*—Morton Foelak
*Assistant Examiner*—P. Hampton-Hightower
*Attorney, Agent, or Firm*—Sughrue, Mion, Zinn, Macpeak & Seas

[57] ABSTRACT

Wholly aromatic polyamides and their shaped articles containing at least 85 mole percent of repeat units of m-phenylene isophthalamide:

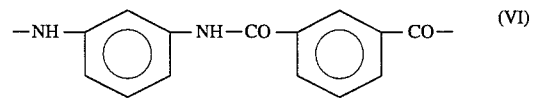

and repeat units of selected aromatic diamines and diacid chlorides exhibit improved flame resistance while retaining good thermal stability.

13 Claims, No Drawings

WHOLLY AROMATIC POLYAMIDES WITH IMPROVED FLAME RESISTANCE

FIELD OF THE INVENTION

The present invention relates to wholly aromatic polyamides with improved flame resistance, and in particular to wholly aromatic polyamides containing at least 85 mole percent of repeat units of m-phenylene isophthalamide and repeat units of selected aromatic diamines and diacid chlorides.

BACKGROUND OF THE INVENTION

Aromatic polyamides, which remain soluble in their polymerization mixture, have been synthesized in the 1950's [S. L. Kwolek and H. H. Yang, "*History of Aramid Fibers*" in "Manmade Fibers: *Their Origin and Development*", ed. by R. B. Seymour and R. S. Porter, Elsevier Applied Science (1993)]. Further improvements in polymerization techniques via low temperature solution polycondensation were achieved in the late 1960's. This led to the synthesis of para-oriented aromatic polyamides [S. L. Kwolek, U.S. Pat. No. 3,600,350 (1977)]. Several distinctive wholly aromatic polyamides have since been derived from these developments. They include, for example, poly(m-phenylene isophthalamide) (MPD-I), poly(p-benzamide) (PBA), and poly(p-phenylene terephthalamide) (PPD-T). Fibers of MPD-I and PPD-T have been commercialized since 1962 and 1972, respectively, and have been widely adopted for industrial applications.

Aromatic polyamides and their shaped articles are known for their excellent properties such as thermal stability, chemical resistance, dimensional stability, flame resistance, and others. Among these properties, the flame resistance is of particular interest for applications in thermal protective apparel. MPD-I fiber, which provides the combination of excellent thermal stability, flame resistance, and textile-like properties, is especially useful for such applications.

The flame resistance of polymers and shaped articles is measured in terms of the Limiting Oxygen Index (LOI), which is defined as the minimum oxygen content of an oxygen/nitrogen atmosphere needed to support burning. It is well known from literature [e.g. H. H. Yang, "*Aromatic High-Strength Fibers*", Wiley Interscience, New York (1989)] that wholly aromatic polymers generally exhibit higher LOI values, i.e., better flame resistance, than aliphatic and aliphatic-aromatic polymers. Among aromatic polymers, however, aromatic heterocyclic polymers and aromatic polyamides are superior to aromatic polyamides in flame resistance. For nylon and polyester, polymer modification via additives or polymer blend has been attempted commercially to improve the flame resistance. For aromatic polyamides, Fujie et al. [U.S. Pat. No. 4,196,118 (1980)] taught the use of an organic compound containing phosphorous and halogen as a fire retardant to improve the flame resistance of MPD-I. Fibers of such polymer compositions exhibited excellent flame resistance, but substantially inferior thermal stability.

SUMMARY OF THE INVENTION

It is, therefore, an object of this invention to improve the flame resistance of wholly aromatic polyamides while retaining good thermal stability. More specifically, it is a further object of this invention to improve the flame resistance of MPD-I via polymer modifications.

In the present invention, we have found that the flame resistance of wholly aromatic polyamides, especially poly(m-phenylene isophthalamide) (MPD-I) can be improved by incorporating no more than 15 mole percent but not less than 2 mole percent, and preferably not less than 5 mole percent, of aromatic segments represented by the following general formulas I–V:

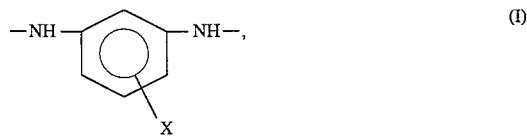

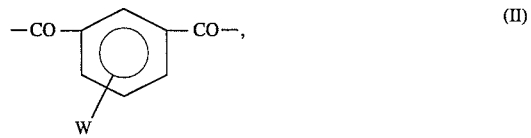

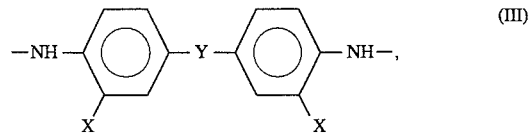

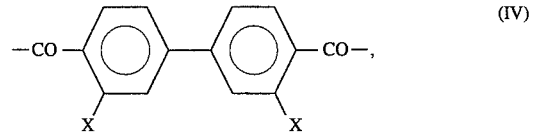

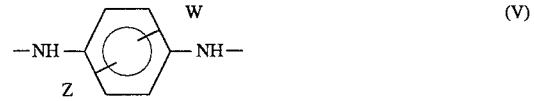

wherein W represents halogen, COOH, or $C_nH_{2n+1}$, where n represents 0, 1, or 2; X represents halogen, $CH_3$, or H; Y represents $C_{n'}H_{2n'}$, where n' represents 1 or 2, O, S, $SO_2$ or deleted; and Z represents halogen, COOH, or $C_{n''}H_{2n''+1}$, where n'' represents 1 or 2.

DETAILED DESCRIPTION OF THE INVENTION

The term "wholly aromatic polyamide" according to the invention refers to a linear polymer containing at least 85 mole percent of repeat units represented by the following general formulas:

—[—NR$_1$—Ar$_1$—NR$_2$—CO—Ar$_2$—CO—]—

—[—NR$_3$—Ar$_3$—CO—]— where Ar$_1$, Ar$_2$, and Ar$_3$ are aromatic radicals, and Ar$_1$ and Ar$_2$ may be the same or different; R$_1$, R$_2$ and R$_3$ are a lower alkyl group or hydrogen, and R$_1$ and R$_2$ may be the same or different. According to the present invention, the wholly aromatic polyamide is modified to include no more than 15 mole percent but not less than 2 mole percent, and preferably not less than 5 mole percent, of the above-described aromatic segments of formulas (I)–(V).

An example of this wholly aromatic polyamide is poly(m-phenylene isophthalamide) and its related copolymers containing at least 85 mole percent of repeat units of m-phenylene isophthalamide represented by the following formula:

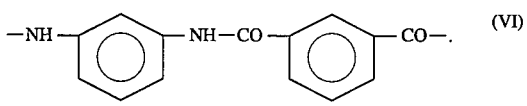

The polymers of this invention can be prepared by low temperature polycondensation from the reaction of: (a) meta aromatic diamines; (b) meta aromatic diacid chlorides; and (c) one or more comonomers having repeat units of the following general formulas I–V:

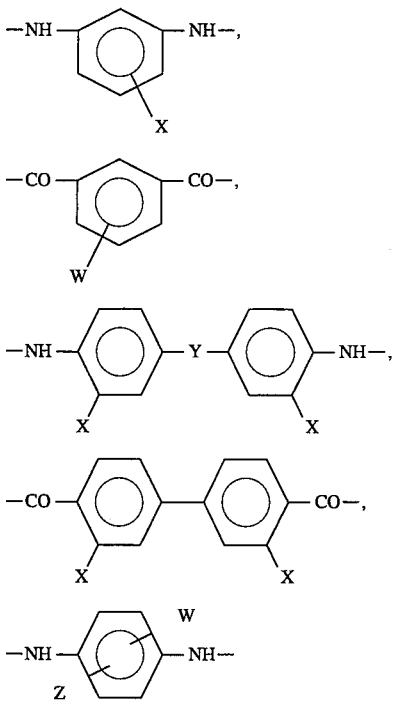

wherein W represents halogen, COOH, or $C_nH_{2n+1}$, where n represents 0, 1, or 2; X represents halogen, $CH_3$, or H; Y represents $C_{n'}H_{2n'}$, where n' represents 1 or 2, O, S, $SO_2$ or deleted; and Z represents halogen, COOH, or $C_{n''}H_{2n''+1}$, where n" represents 1 or 2.

Examples include wholly aromatic polyamides produced by polycondensation of: (a) m-phenylene diamine; (b) isophthaloyl chloride; and (c) one of the following comonomers:

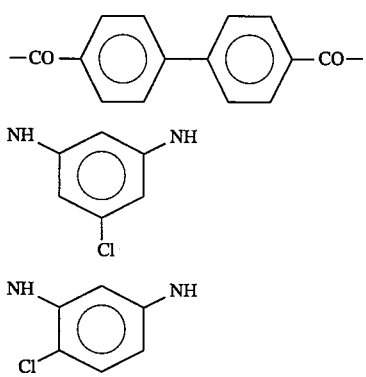

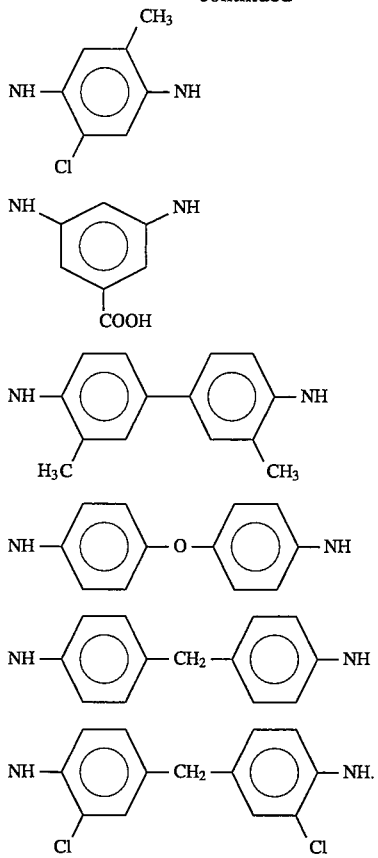

The polymerization reaction takes place in an amide solvent, optionally in the presence of an alkali salt. Useful amide solvents include N,N'-dimethyl acetamide (DMAc), dimethyl formamide, and N-methyl-2-pyrrolidone (NMP). The alkali salts include calcium chloride, lithium chloride, lithium carbonate, etc. The polymerization mixture usually contains more than 10 percent by weight of monomer. The amount of alkali salt in the polymerization mixture may vary from none to an excess over the solubility limit of the salt, depending on the polymer solubility and its concentration in the polymerization mixture. The polymerization temperature generally ranges from −10° C. to 10° C. initially, to below about 70° C. at the conclusion of reaction. The reaction time varies with the polymer compositions. High polymer molecular weight can usually be attained within 1 to 2 hours of reaction time.

Fibers made according to the present invention have a linear density of greater than 0.25 denier/filament.

The invention will now be described in greater detail with reference to the following non-limiting examples.

EXAMPLE 1

This example illustrates the preparation of poly(m-phenylene isophthalamide (MPD-I).

In a 5-liter jacketed cylindrical glass reactor with a pair of wall-wiping helical mixing blades was placed a mixture of 409.0 g (3.78 mole) of m-phenylenediamine (MPD) in 3605 g (3500 ml) of anhydrous N-methyl-2-pyrrolidone (NMP) under nitrogen purge. With the mixing blades at gentle stirring, ice water was circulated through the reactor jacket in order to cool the MPD/NMP solution to about 0° C. After about 15 minutes, 767.9 g (3.78 mole) of isophthaloyl chloride (ICl) in fine powder form was slowly added to the glass reactor. As the reactor temperature began to rise and the reaction mixture became increasingly viscous, the circulation of ice water through the reactor jacket was continued and the mixing speed was gradually increased. After about 20 minutes of reaction time, the circulation of ice water through the reactor jacket was reduced so that the reactor temperature was allowed to rise from about 0° C. to 60° C. in the ensuing 10 to 15 minutes. The reaction was terminated at that time by transferring the reaction mixture into a storage vessel and allowing the transferred reaction mixture to stand. Upon cooling to ambient temperature, the reaction mixture became a highly viscous gel-like mass of light amber color. The polymerization mixture contained about 20% by weight of MPD-I polymer. The inherent viscosity ($\eta_{inh}$) of the resulting aromatic polyamide was measured at a polymer concentration (c) of 0.5 g/100 ml in 97% concentrated sulfuric acid at 30° C. and determined from the relative viscosity ($\eta_{rel}$) according to the following equation: $\eta_{inh}=\ln(\eta_{rel})/c$. The polymer had an inherent viscosity of 1.1 dL/g.

A small piece of polymer film, about 2 grams, was cast on a glass plate by the conventional method. The film was dried in a vacuum oven at 150° C. and 76 mm Hg for 6 hours to dryness. It was then subjected to Thermogravimetric Analysis (TGA) and Limiting Oxygen Index (LOI) tests. The 5% weight loss temperature ($T_5$) of this polymer, as measured by TGA was 444.5° C. The LOI of this polymer in a film form as measured by ASTM procedure D 2863-87, was 27%. Table 1 lists the physical properties ($\eta_{inh}$, $T_5$, LOI) of this polymer.

EXAMPLES 2–10

These examples illustrate the properties of copolymers of m-phenylene isophthatamide.

The procedure of Example 1 was followed except that a comonomer of an aromatic diamine or a diacid chloride in the amount of 10 mole percent of total diamine or diacid chloride was added to the reactor along with MPD or ICL respectively. The polymerization reaction was then carried out in the same manner as in Example 1.

The inherent viscosity, degradation temperature, and Limiting Oxygen Index of these polymers are presented in Table 1. The 5% weight loss temperature of these copolymers ranged from 388.5° C. to 449.4° C. as compared to 444.5° C. for MPD-I.

The Limiting Oxygen Index of these copolymers ranged from 27.4% to 33.6% as compared to 27.2% for MPD-I. Thus, these copolymers exhibited better flame resistance than MPD-I while retaining substantially similar thermal stability.

COMPARATIVE EXAMPLE

The example pertains to the preparation of a 90/10 mixture of MPD-I and tris(chloroethyl) phosphate (TCP) according to Fujie et al. [U.S. Pat. No. 4,196,118, issued 1980].

A solution of 3 grams of MPD-I dry polymer prepared in Example 1 in 151 grams of NMP was prepared at about 70° C. The amount of 0.3 grams of TCP was added into the polymer solution and mixed thoroughly. A film specimen of the MPD-I/TCP mixture was prepared from this solution in the same manner as described in Example 1 for the TGA test.

The 5% weight loss temperature ($T_5$) of MPD-I containing 10% by weight TCP was found to be 260.1° C. compared to 444.5° C. for MPD-I of Example 1. The LOI of the MPD-I/TCP mixture was reported to be 36% by Fujie et al. [U.S. Pat. No. 4,196,118]. Thus, the inclusion of TCP in MPD-I improved its flame resistance, but adversely affected its thermal stability.

TABLE 1

| Example | Repeat unit of comonomer at 10 mole % | Inherent viscosity (dL/g) | $T_5$, TGA 5% wt. loss temp. (°C.) | LOI (%) |
|---|---|---|---|---|
|  | no comonomer | 1.12 | 444.5 | 27.2 |
| 2 | —CO—⟨biphenyl⟩—CO— | 1.05 | 431.6 | 30.9 |
| 3 | NH—⟨phenyl-Cl⟩—NH (Cl meta) | 1.24 | 438.2 | 29.6 |
| 4 | NH—⟨phenyl-Cl⟩—NH (Cl ortho) | 1.48 | 417.5 | 30.1 |
| 5 | NH—⟨phenyl(CH₃)(Cl)⟩—NH | 1.10 | 436.5 | 28.1 |

TABLE 1-continued

| Example | Repeat unit of comonomer at 10 mole % | Inherent viscosity (dL/g) | $T_5$, TGA 5% wt. loss temp. (°C.) | LOI (%) |
|---|---|---|---|---|
| 6 | NH-(benzene with NH and COOH) | 1.20 | 417.1 | 30.5 |
| 7 | NH-(benzene-CH₃)-(benzene-CH₃)-NH | 0.80 | 441.4 | 33.6 |
| 8 | NH-(benzene)-O-(benzene)-NH | 1.60 | 418.2 | 27.4 |
| 9 | NH-(benzene)-CH₂-(benzene)-NH | 1.40 | 388.5 | 30.9 |
| 10 Comparative | NH-(benzene-Cl)-CH₂-(benzene-Cl)-NH | 2.14 / 1.1 | 436.6 / 260.1 | 27.4 / 36 |

While the invention has been described in detail and with reference to specific embodiments thereof, it will be apparent to one skilled in the art that various changes and modifications can be made therein without departing from the spirit and scope thereof.

What is claimed is:

1. A wholly aromatic copolyamide with improved flame resistance and good thermal stability produced by polycondensation of:

(a) a meta aromatic diamine;
   (b) a meta aromatic diacid chloride; and
   (c) no more than 15 mole percent, but no less than 2 mole percent of one or more comonomers having repeat units of the following general formulas:

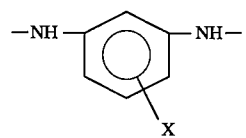
(I)

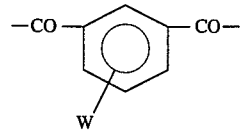
(II)

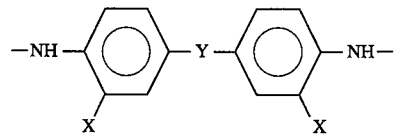
(III)

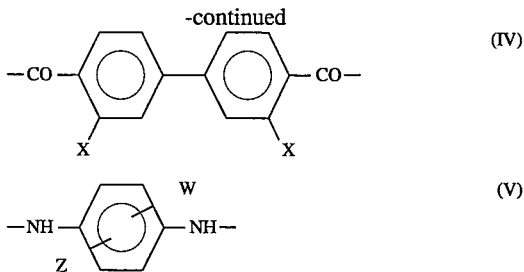
(IV)

(V)
—NH—(benzene with W, Z)—NH— wherein W represents halogen, COOH, or $C_nH_{2n+1}$, where n represents 0, 1, or 2; X represents halogen, $CH_3$, H; Y represents $C_{n'}H_{2n'}$ where n' represents 1 or 2, O, S, or $SO_2$ or Y is absent and Z represents halogen, COOH, or $C_{n''}H_{2n''+1}$ where n'' represents 1 or 2.

2. The wholly aromatic copolyamide as claimed in claim 1, wherein (a) is m-phenylene diamine, (b) is isophthaloyl chloride, and (c) is

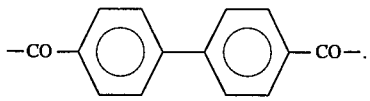
.

3. The wholly aromatic copolyamide as claimed in claim 1, wherein (a) is m-phenylene diamine, (b) is isophthaloyl chloride, and (c) is

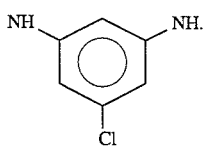

4. The wholly aromatic copolyamide as claimed in claim 1, wherein (a) is m-phenylene diamine, (b) is isophthaloyl chloride, and (c) is

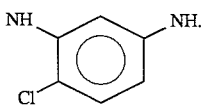

5. The wholly aromatic copolyamide as claimed in claim 1, wherein (a) is m-phenylene diamine, (b) is isophthaloyl chloride, and (c) is

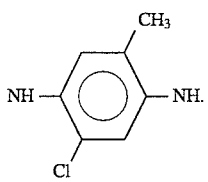

6. The wholly aromatic copolyamide as claimed in claim 1, wherein (a) is m-phenylene diamine, (b) is isophthaloyl chloride, and (c) is

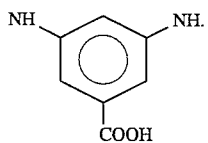

7. The wholly aromatic copolyamide as claimed in claim 1, wherein (a) is m-phenylene diamine, (b) is isophthaloyl chloride, and (c) is

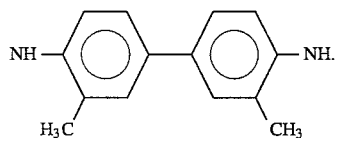

8. The wholly aromatic copolyamide as claimed in claim 1, wherein (a) is m-phenylene diamine, (b) is isophthaloyl chloride, and (c) is

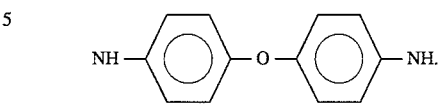

9. The wholly aromatic copolyamide as claimed in claim 1, wherein (a) is m-phenylene diamine, (b) is isophthaloyl chloride, and (c) is

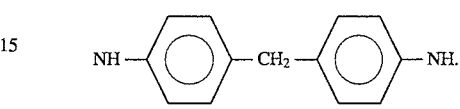

10. The wholly aromatic copolyamide as claimed in claim 1, wherein (a) is m-phenylene diamine, (b) is isophthaloyl chloride, and (c) is

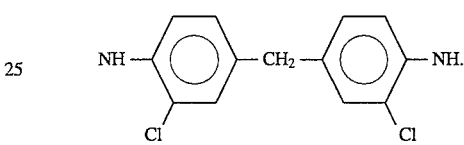

11. The wholly aromatic copolyamide as claimed in claim 1, consisting essentially of at least 85 mole percent of repeating units of m-phenylene isophthalamide represented by the following formula (VI):

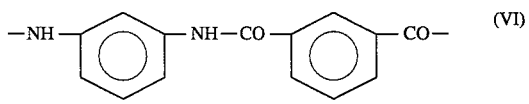

(VI)

and no more than 15 mole percent to one or more comonomers having repeating units of the general formulas (I), (II), (III), (IV) or (V).

12. A shaped article made from the wholly aromatic copolyamide as claimed in claim 1.

13. The shaped article as claimed in claim 12, which is a fiber with a linear density greater than 0.25 denier/filament.

* * * * *